United States Patent
Ghiware et al.

(10) Patent No.: US 8,032,114 B2
(45) Date of Patent: Oct. 4, 2011

(54) SERVICE ACCESS REQUEST AUTHORIZATION

(75) Inventors: Swapnil Kashinath Ghiware, Fremont, CA (US); Ravi Nag Chamarthy, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1208 days.

(21) Appl. No.: 11/033,355

(22) Filed: Jan. 7, 2005

(65) Prior Publication Data
US 2006/0153073 A1  Jul. 13, 2006

(51) Int. Cl.
*H04M 1/66* (2006.01)

(52) U.S. Cl. ........................................ 455/410; 455/411

(58) Field of Classification Search .......... 455/406–408, 455/411, 410
See application file for complete search history.

(56) References Cited

U.S. PATENT DOCUMENTS

| | | | |
|---|---|---|---|
| 2002/0058494 A1* | 5/2002 | Timonen et al. | 455/405 |
| 2003/0110044 A1* | 6/2003 | Nix et al. | 705/1 |
| 2006/0171382 A1* | 8/2006 | Mohri et al. | 370/389 |

* cited by examiner

*Primary Examiner* — Lester Kincaid
*Assistant Examiner* — Joel Ajayi

(57) ABSTRACT

Embodiments of methods for handling a service authorization request (SAR) from a mobile subscriber are disclosed. The SAR represents a request for access to a given prepaid mobile service. The method includes ascertaining, using suspect subscriber list, whether the SAR is associated a suspect subscriber in the suspect subscriber list. The method further includes authorizing, if the SAR is not associated with the suspect subscriber, the SAR without waiting until response-determinative processing is performed on the SAR.

33 Claims, 4 Drawing Sheets

SERVICE ACCESS REQUEST AUTHORIZATION

BACKGROUND OF THE INVENTION

Prepaid mobile services represent optional services that a mobile subscriber can access and pay for with a pre-established account. For example, a cellular telephone user or a wireless palm-top computer user may pre-establish an account with his service provider in order to pay for his subsequent access to voice and/or data services such as teleconferencing, music downloading, specialized web content accessing, etc.

In the prior art, a request for a prepaid mobile service (i.e., a mobile service that is charged based on usage against a pre-established account) must be approved in advance before the mobile subscriber is allowed to access the requested prepaid mobile service. For example, if a mobile subscriber requests to download a particular song that costs $2.00 into his cellular telephone, the request must be authorized in advance before the mobile subscriber is allowed to access the downloading site to download the requested song.

In the prior art, when a mobile subscriber sends a prepaid mobile service authorization request (SAR) to request access to a particular service, the SAR is fully processed before authorization is granted or denied. Full processing typically involves looking up the subscriber status (e.g., whether the subscriber has established a prepaid account), rating the service request (e.g., determining the cost associated with fulfilling the request), determining subscriber balance sufficiency (e.g., whether the balance in the subscriber's prepaid account is sufficient to pay for the requested service), and storing transaction data (e.g., to ensure that the subscriber's account is only charged once if the server happens to crash in the middle of service rendering).

It has been found, however, that the full processing of the SAR introduces a substantial delay between the time the SAR is issued by the subscriber and the time an authorization response (e.g., authorize or deny) is received. Although some of the aforementioned delay is due to the inherent latency through the data network and particularly through the voice network, a substantial portion of the delay is attributable to the requirement that the SAR be fully processed before an authorization response can be issued. In some cases, 4 seconds or more may pass before the mobile subscriber receives a response to the SAR, of which 1 to 2 seconds or more may be attributable to the full processing of the SAR.

Full processing of the SAR takes a non-trivial amount of time since each processing step may involve a different third-party application program and may also involve accessing a different specialized database. For example, looking up the subscriber status may involve accessing the subscriber repository management application, which may further involve accessing a subscriber database. As another example, rating the service request may involve accessing the service rating application, which may further involve accessing a service cost database. As yet another example, determining subscriber balance sufficiency may involve accessing the billing application, which may further involve accessing a billing database. Each of these processing steps may involve a latency in the range of 200 milliseconds to 1.5 seconds, for example.

For subscribers conditioned to expect an immediate response to a service request (such as the immediate response experienced when a service request is issued through a browser program on a desktop computer, for example), the lengthy delay between the time a SAR is sent and the time an authorization response is received may be deemed unacceptably long by some. Some of these subscribers may, as a response, choose not to bother with the prepaid mobile services in the future due to the perceived lengthy delay, thereby resulting in a loss of potential revenue for the providers of such prepaid services. Other subscribers may express their dissatisfaction by switching to other mobile service providers, particularly if they perceive, rightly or wrongly, that the delay is the fault of their current mobile service providers.

As a response to customer complaints, some mobile service providers have adopted a "hot billing" approach to processing SARs. When a "hot billing" mobile service provider receives any SAR, authorization is granted immediately, and the requesting subscriber may immediately begin using the requested service. Concurrently, the SAR is processed to obtain an authorization confirmation. If the authorization confirmation is a negative (e.g., if the requesting subscriber has an insufficient account balance to cover the requested service), the service that is already under way is terminated. On the other hand, if the authorization confirmation is positive, the subscriber is allowed to continue to use the service already authorized.

However, many types of service can be completed in the short time it takes to perform the full processing of the SAR. In other words, by the time a "negative" authorization confirmation is ascertained, the requested service may have been completed already. Because of this loophole in the hot billing approach, some dishonest subscribers have been able to fraudulently obtain certain services over and over without having to maintain an adequate account to pay for those services.

Furthermore, hot billing may also alienate some credit-worthy but honestly mistaken subscribers. For example, some otherwise honest and credit-worthy subscribers may, through a misunderstanding or because of an honest mistake, inadvertently request a service that costs more than the remaining balance in their prepaid account. Pursuant to hot billing, such a subscriber may experience an abrupt termination of a requested service after usage has begun. The abrupt termination may unduly annoy such a subscriber, causing that subscriber to be dissatisfied with and to possibly terminate his service with the mobile service provider. As a result, the mobile service provider may lose potential revenue and/or may lose an honest and credit-worthy subscriber, precisely the type of subscriber that most mobile service providers wish to acquire and retain.

SUMMARY OF INVENTION

The invention relates, in an embodiment, to a method for handling a service authorization request (SAR) from a mobile subscriber. The SAR represents a request for access to a given prepaid mobile service. The method includes ascertaining, using suspect subscriber list, whether the SAR is associated a suspect subscriber in the suspect subscriber list. The method further includes authorizing, if the SAR is not associated with the suspect subscriber, the SAR without waiting until response-determinative processing is performed on the SAR.

In yet another embodiment, the invention relates to an article of manufacture comprising a program storage medium having computer readable code embodied therein. The computer readable code is configured to handle a service authorization request (SAR) from a mobile subscriber. The SAR represents a request for access to a given prepaid mobile service. There is included computer readable code for ascertaining, using suspect subscriber list, whether the SAR is associated a suspect subscriber in the suspect subscriber list.

There is also included computer readable code for authorizing the SAR, if the SAR is not associated with the suspect subscriber, without waiting until response-determinative processing is performed on the SAR.

In yet another embodiment, the invention relates to an arrangement for handling a service authorization request (SAR) from a mobile subscriber. The SAR represents a request for access to a given prepaid mobile service. There is included a suspect subscriber list that contains the identity of suspect subscribers whose SARs require authorization before being allowed to access prepaid mobile services. There is further included means for ascertaining whether the SAR is associated a suspect subscriber in the suspect subscriber list and for authorizing the SAR, if the SAR is not associated with the suspect subscriber, without waiting until response-determinative processing is performed on the SAR.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
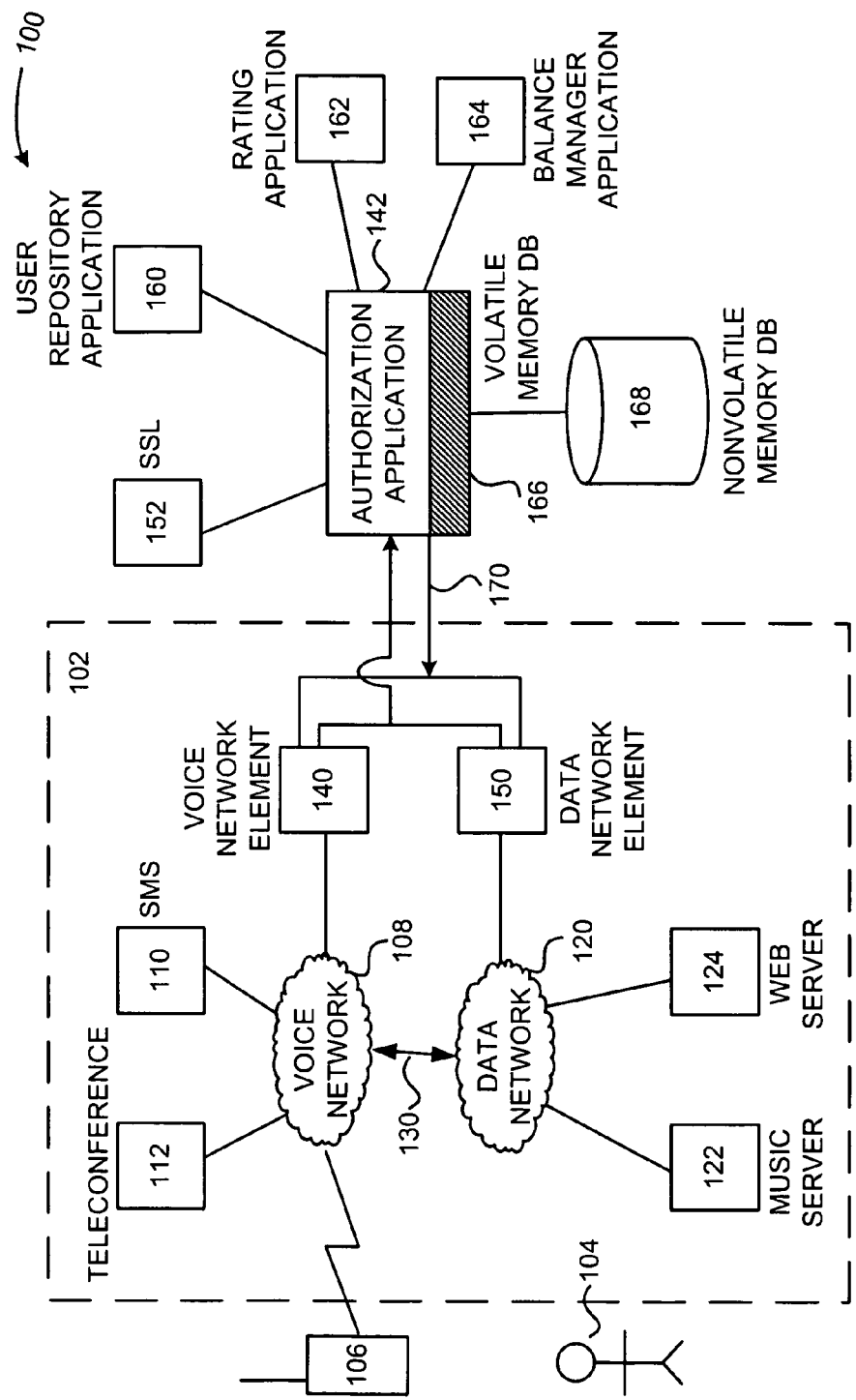
FIG. 1 shows, in accordance with an embodiment of the present invention, an architectural view of a mobile service authorization environment.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention may also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

It is noted by the inventors herein that due to the inherent delay in the voice network and the data network, which inherent delay is characteristic of mobile services, the additional delay introduced by the prior art service authorization request processing results in an unduly long delay between the time a subscriber issues a service authorization request and the time the prior art can respond with an authorization denial or an authorization approval to allow service access to begin. For some users, such an unduly long delay is intolerable. Accordingly, the inventors herein felt that another approach to service authorization request processing is needed.

Embodiments of the invention relate to arrangements and methods for authorizing service authorization requests (SARs) from mobile subscribers in a time-efficient manner while reducing fraud-related economic loss to the mobile service providers. In an embodiment, a suspect subscriber list (SSL) is kept by the authorization application, i.e., the application program that is responsible for authorizing or denying SARs. When a subscriber sends a SAR, unless that subscriber is on the SSL, that subscriber's SAR is authorized immediately without having to wait for further processing of the SAR. In this manner, the substantial delay associated with the response-determinative processing of the SAR is avoided.

Once the SAR is authorized, further processing of the SAR takes place in parallel with service accessing by the subscriber. In an embodiment, if it is found through the concurrent processing of the SAR that the cost of the service requested by the subscriber exceeds the remaining balance of that subscriber's account, that subscriber is put on the SSL. The next time that subscriber issues a SAR, that subscriber's SAR will be subject to the response-determinative processing of the SAR instead of being automatically approved.

As the term is employed herein, the response-determinative processing of the SAR includes the processing to obtain a definitive authorization response to the SAR (i.e., authorize or deny) based on the user's prepaid account balance and/or the nature of the request. Such processing may include subscriber status lookup (e.g., determining if the subscriber is authorized to employ prepaid services, determining if the subscriber is old enough to employ a particular prepaid service, etc.), rating the service (e.g., determining the cost of the requested service based on factors such as the type of service, the time of the request, the location of the request, etc.), determining subscriber balance sufficiency (e.g., determining whether there is sufficient funds in the subscriber's account to cover the cost of the requested service), fund replenishment (e.g., asking the subscriber to add funds if the account balance falls below a predefined threshold or if the subscriber balance is deemed insufficient to cover the cost of the requested service), and/or storing transaction data associated with the SAR (e.g., for auditing purposes or to ensure that the subscriber is not charged multiple times in the event of system crash, etc.). It should be appreciated that response-determinative processing may include some or all of the above and may even include additional processing steps as deemed appropriate by a particular service provider to obtain a definitive SAR response.

In an embodiment, certain services may require the response-determinative processing of the SAR before authorization can be granted irrespective whether the subscriber is in the SSL. For example, certain services may be deemed a high fraud risk or may involve substantial costs. In these cases, response determinative processing is undertaken even if the requesting subscriber is not in the SSL.

In an embodiment, transaction data associated with the SAR and/or with the processing of the SAR is stored in a volatile memory database instead of in a nonvolatile memory database (as in the case with the prior art). Such transaction data may include, for example, the type of service requested, the amount involved, transaction IDs associated with the processing of the SAR, etc. The transaction data may be stored only for the duration of the service and may be erased from the volatile memory database after the service is finished. Accordingly, the size of the volatile memory database is kept manageable, enabling the use of volatile memory to achieve high speed. As the term is employed herein, a volatile memory database refers to the implementation of the entire transaction database in volatile memory. This is in contrast with the practice of caching, which stores only a portion of the transaction database in volatile memory and the remaining of the transaction database in nonvolatile memory.

In the prior art, the use of volatile memory to implement the entire transaction database is avoided due to safety concerns since data in volatile memory is subject to loss in the event of a system crash. To minimize the risk of data loss, the volatile memory database is persisted, i.e., synchronized, to nonvolatile memory (such as nonvolatile semiconductor memory, magnetic-based, or optical-based storage). The volatile memory database may be persisted periodically or may be persisted upon the occurrence of an operator-specified triggering event. The transaction data in the volatile memory database may be synchronized with the nonvolatile memory database in an additive fashion or in a mirroring fashion. Additive synchronization allows a full historical record of the transaction data to be kept even if the transaction data associated with a particular SAR is subsequently erased from the volatile memory database. Mirroring synchronization ensures that an exact copy of the volatile memory database exists in nonvolatile memory immediately after synchronization is completed. Synchronization of databases is well-known and will not be elaborated here.

In either case, the risk of data loss is minimal if the volatile memory database is persisted to nonvolatile memory at an appropriate frequency. For example, if there are 1,000 access requests per second and the volatile memory database is persisted to nonvolatile memory every 10 milliseconds, a maximum of only 1% of 1,000 requests or 10 requests would be at risk in the event of a system failure. A cost-benefit analysis may very well favor the service provider's decision to risk the potential revenue loss from the 1% of the then-pending requests in the event of a system crash than to risk the potential annoyance to all users due to the extra delay required to store all transaction requests to nonvolatile memory prior to request authorization.

The features and advantages of embodiments of the invention may be better understood with reference to the figures and discussions that follow. FIG. 1 shows, in accordance with an embodiment of the present invention, an architectural view of a mobile service authorization environment 100. Mobile service authorization environment 100 includes the mobile service network 102 through which a subscriber may issue a service authorization request for one of the services offered therein. For example, the subscriber 104 may employ a mobile device 106 (which may represent, for example, a cellular phone or any wireless computing device such as a wireless palm-top computer or a wireless personal digital assistant) to issue a service access request to a voice network 108. The service access request issued by subscriber 104 may pertain to services furnished via voice network 108, such as SMS (short messaging service) 110 or teleconference service 112. The service access request issued by subscriber 104 may also pertain to a service offered by a data network 120 such as music downloading via music server 122, webpage downloading or accessing via web server 124, etc. Voice network 108 may be coupled to data network 120 via a bridge circuit 130, for example.

If the service access request pertains to a service offered via voice network 108, a voice network element 140 passes the service authorization request (SAR) to authorization application 142, which is responsible for granting or denying the service access request. Likewise, if the service access request pertains to a service offered via data network 120, a data network element 150 passes the SAR to authorization application 142 to determine whether the service authorization request is to be authorized or denied.

In an embodiment, authorization application 142 executes on a server. The server may be Windows™-based (Windows™ is available from the Microsoft Corporation of Redmond, Wash.), Linux-based, HP-UX™ based (HP-UX™ is available from the Hewlett-Packard Company of Palo Alto, Calif.), Solaris™-based (Solaris™ is available from Sun Microsystems, Inc. of Mountain View, Calif.), or may be based on any other suitable operating system. Authorization application 142 may also be distributed over many interconnected servers to distribute the processing workload.

Authorization application 142 maintains a suspect subscriber list (SSL) 152, representing the list of subscribers (e.g., by names or by some data that uniquely represents the identity of the suspect subscribers) whose SARs are subject to the response-determinative processing prior to authorization. Subscribers are put on suspect subscriber list 152 if their behavior or status renders them a poor credit risk. For example, if a subscriber's account balance dips below a certain predefined threshold or dips below zero due to a previous service access request, that subscriber may be put on suspect subscriber list 152 so that a subsequent SAR from that subscriber would be subject to the response-determinative processing. In an embodiment, new subscribers who are in a probationary period may also be placed in suspect subscriber list 152 until their probationary period expires, for example.

If a subscriber is on suspect subscriber list 152, a SAR from that subscriber will be subject to the response-determinative processing even if such response-determinative processing involves some delay before the authorization response (e.g., authorize or deny) is issued. On the other hand, if a subscriber is not on suspect subscriber list 152, a SAR by that subscriber is immediately authorized, thereby relieving that subscriber from having to suffer through the delay that accompanies the response-determinative processing of the SAR. The authorization may be sent back to the appropriate network element via path 170 to permit access to the service to begin.

The use of a suspect subscriber list is advantageous since it is expected that only a small percentage of the total number of subscribers in a given network would be placed on the suspect subscriber list. If a "good subscriber list" had been maintained instead and had been consulted to decide whether authorization should be granted right away, that "good subscriber list" would likely be larger for any given subscriber population. The larger "good subscriber list" would have required greater resources to maintain and would have taken longer to search through.

If authorization is granted immediately after the SSL is consulted in response to a SAR, the response-determinative processing of that SAR may still take place in parallel with the service accessing after the authorization is given. In other words, the subscriber is allowed to begin using the requested service before the response-determinative processing of the SAR completes. In an embodiment, the response-determinative processing includes subscriber status lookup using a user repository application 160. As mentioned, subscriber status lookup may involve, for example, determining if the subscriber is authorized to employ prepaid services, determining if the subscriber is old enough to employ a particular prepaid service, etc. Alternatively or additionally, the response-determinative processing may include rating the service associated with the SAR using a rating application 162. Rating the service may include, for example, determining the cost of the requested service based on factors such as the type of service, the time of the request, the location of the request, etc.

Alternatively or additionally, the response-determinative processing may include determining subscriber balance sufficiency using a balance manager application 164. Determining subscriber balance sufficiency may include, for example, determining whether there is sufficient funds in the subscriber's account to cover the cost of the requested service. If the subscriber account balance is insufficient, there may be included fund replenishment processing, which may include asking the subscriber to add funds if the account balance falls below a predefined threshold or if the subscriber balance is deemed insufficient to cover the cost of the requested service. Alternatively or additionally, the response-determinative processing may include storing transaction data associated with the SAR in a volatile memory database 166. The transaction data may be stored for auditing purposes or to ensure that the subscriber is not charged multiple times in the event of system crash. Periodically (the duration of the period may be operator-configurable) or upon the occurrence of a pre-specified or operator-configurable triggering event, the transaction data in the volatile memory database 166 is persisted to a nonvolatile memory database 168.

The response-determinative processing may include concluding that authorization should be granted or denied and communicating that authorization response back (via path 170) to either voice network element 140 or data network element 150. If denied, the denial message may be transmitted to subscriber 104 to allow subscriber 104 to take remedial action. If authorized, the service already granted may proceed without interruption. In this case, a transmission of the approving authorization back to the network element may be unnecessary since an approval is already sent before the commencement of the response-determinative processing.

If the SAR involves a service that always requires the response-determinative processing of the SAR or if the subscriber issuing the SAR is a suspect subscriber in the suspect subscriber list, the response-determinative processing is performed on the SAR first before authorization is granted or denied. In this case, authorization is granted only if the result of the response-determinative processing indicates an approval. Otherwise, the SAR is denied.

Figure 2:
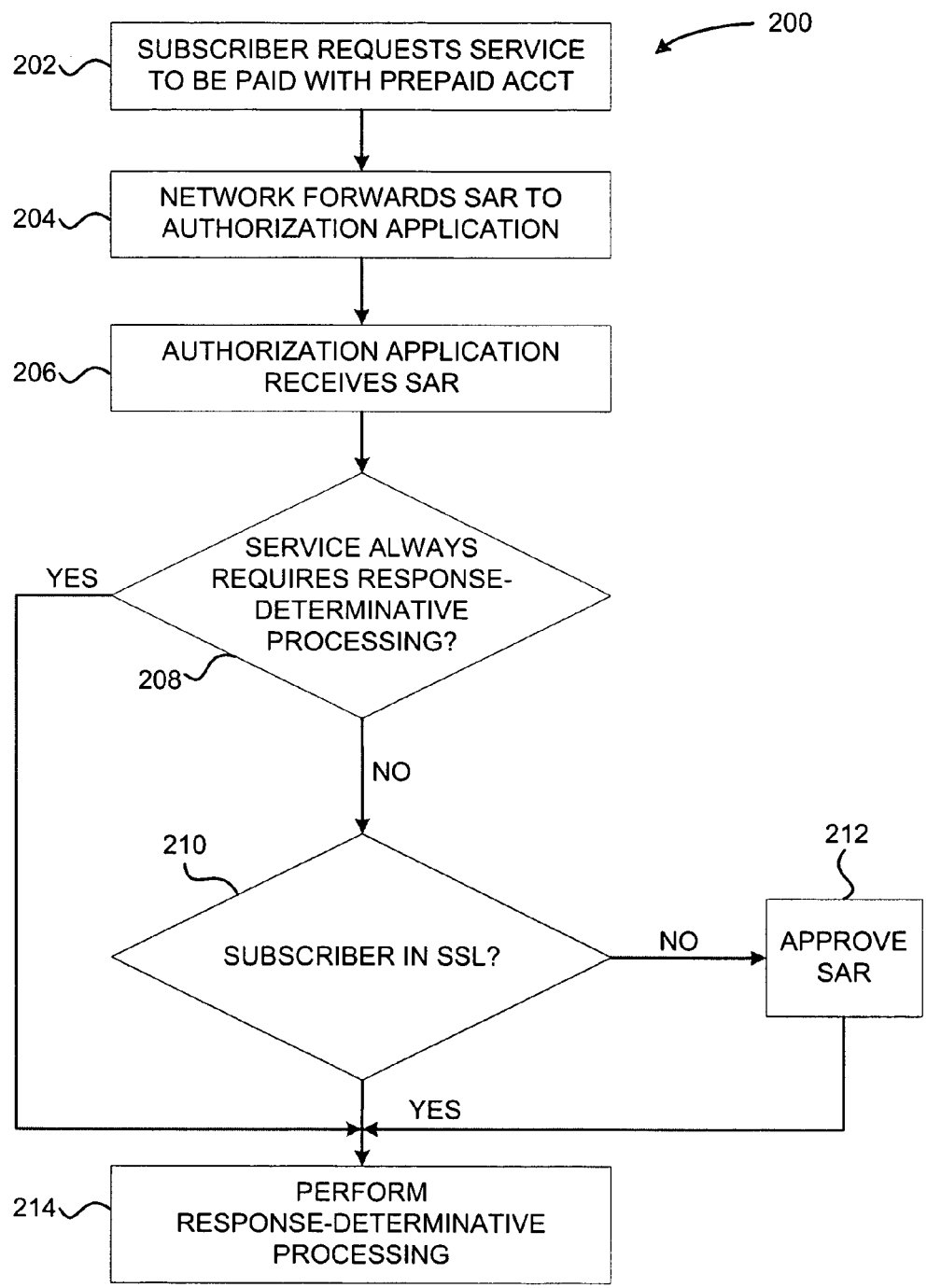
FIG. 2 is a flowchart illustrating, in accordance with an embodiment of the present invention, he steps for processing a service access request.

FIG. 2 represents, in accordance with an embodiment of the present invention, a flowchart 200 illustrating the steps for processing a SAR. In step 202, the subscriber requests a service to be paid with his prepaid account. In step 204, the network (either the voice network or the data network) forwards the service access request (SAR) to the authorization application. In step 206, the authorization application receives the SAR.

In step 208, the service associated with the SAR is checked to ascertain whether it is a service that always requires response-determinative processing. As mentioned, services such as those involving a large cost or those deemed highly susceptible to fraud may be subject to the response-determinative processing irrespective whether the requesting subscriber is or is not on the suspect subscriber list.

If the service associated with the SAR is not one that always requires response-determinative processing or if step 208 is not present, the process proceeds to step 210 wherein the suspect subscriber list is checked to ascertain whether the SAR is associated with a suspect subscriber in the suspect subscriber list. If the SAR is not associated with a suspect subscriber in the suspect subscriber list, the authorization is immediately granted (212) and communicated back to the network to allow access to the service to begin. Note that authorization is granted without having to wait for further response-determinative processing of the SAR.

On the other hand, if the service associated with the SAR is one that always requires response-determinative processing (as determined in step 208) or if the SAR is associated with a suspect subscriber in the suspect subscriber list (as determined in step 210), the process proceeds to step 214 wherein the response-determinative processing is undertaken to determine whether to authorize or deny the SAR.

Figure 3:
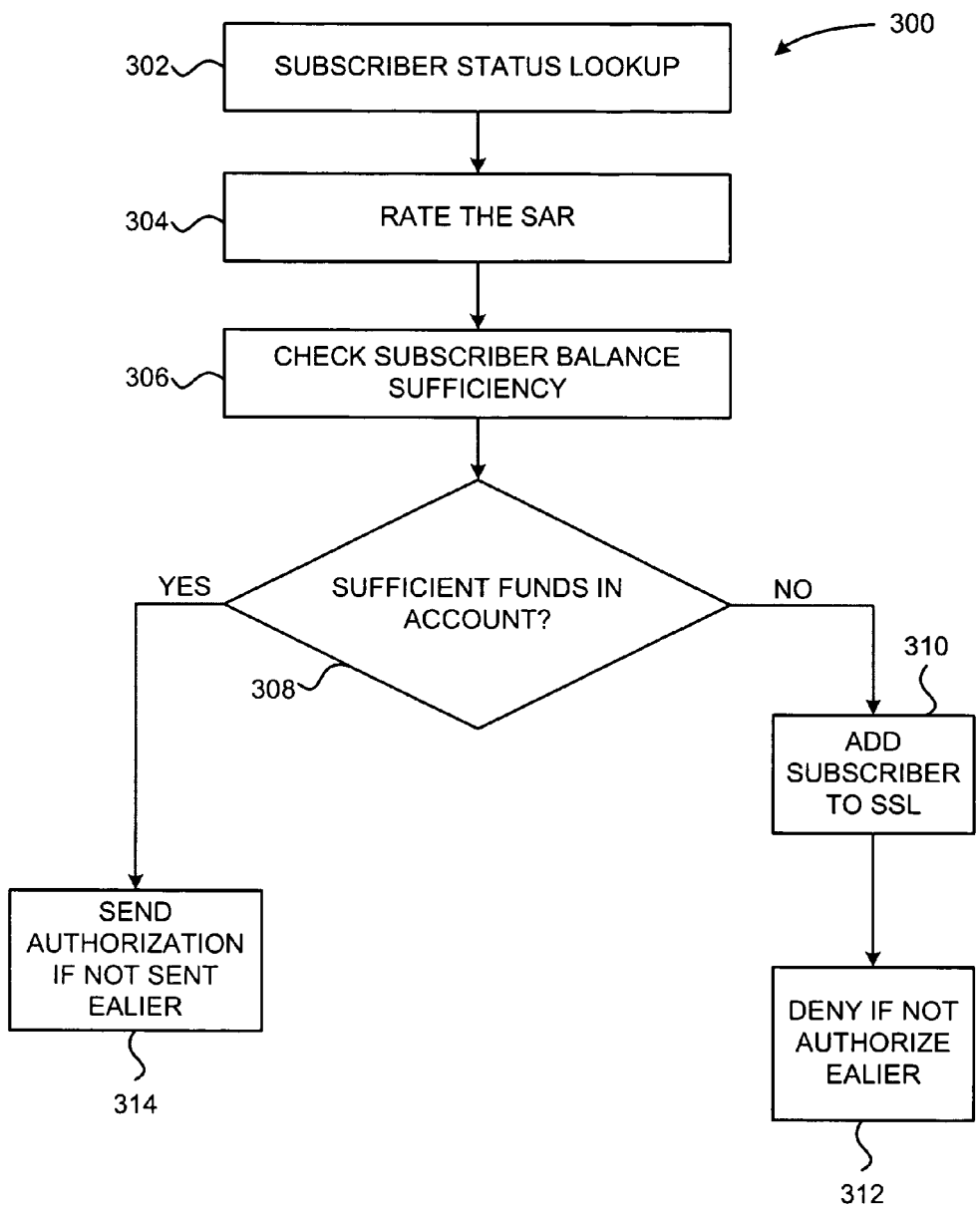
FIG. 3 shows, in accordance with an embodiment of the present invention, the steps associated with the response-determinative processing of a service access request.

FIG. 3 shows, in accordance with an embodiment of the present invention, the steps (300) associated with the response-determinative processing of a SAR. In step 302, subscriber status lookup is performed. In step 304, the service associated with the SAR is rated. In step 306, the subscriber balance sufficiency is checked to see if the user has sufficient funds in his account to cover the requested service.

If there is sufficient funds to cover the requested service (308), an authorization approval message is sent (314), if not sent earlier (e.g., the authorization approval message may have been sent earlier if the subscriber is not on the suspect subscriber list and the service request is not one that always require pre-authorization).

If there is insufficient funds in the requesting subscriber's account to cover the request service, the subscriber is added to the suspect subscriber list (310). In an embodiment, a subscriber remains on the SSL until removed by the service provider. In another embodiment, a subscriber remains on the SSL until he builds up a good credit history (which may be as minimal as having sufficient funds to cover one or more subsequent SARs or maintaining his balance above a certain threshold for a given period of time, for example). If the SAR has not been authorized earlier (e.g., the SAR may not have been authorized earlier if the subscriber is on the suspect subscriber list or if the service request is one that always require pre-authorization), a denial is sent (312) in order to deny access to the requested service.

Figure 4:
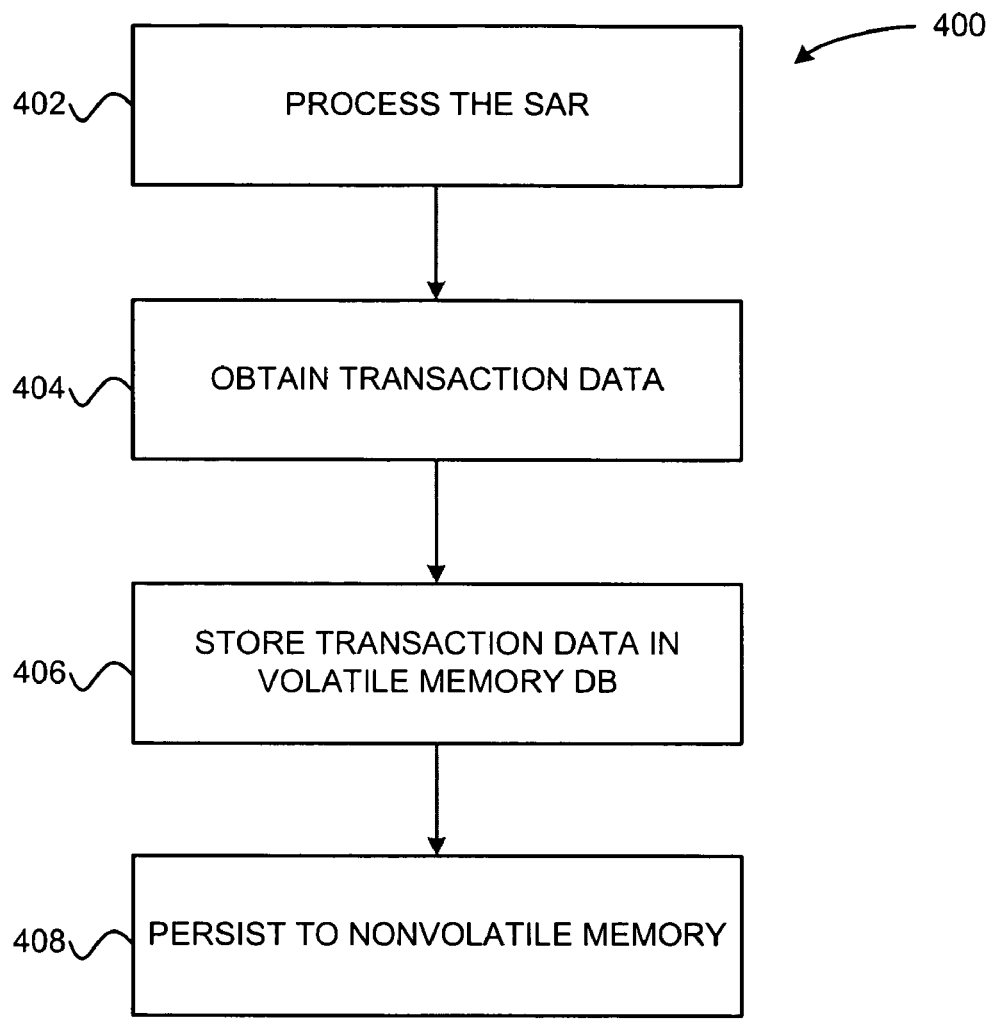
FIG. 4 is a flowchart illustrating, in accordance with an embodiment of the present invention, the steps taken to store transaction data in a volatile memory database and to persist the volatile memory database to nonvolatile memory

FIG. 4 shows, in accordance with an embodiment of the present invention, a flowchart 400 showing the steps taken to store transaction data in a volatile memory database and to persist the volatile memory database to nonvolatile memory. In step 402, the SAR is processed by the authorization application.

In step 404, the authorization application obtains the transaction data pertaining to the SAR. As mentioned, the response-determinative processing of a SAR may involve working with other applications (such as the user repository application, the rating application, the balance manager application, etc.). Transactions with these other applications employ transaction IDs for tracking purposes, and these transaction IDs may form part of the transaction data. Other transaction data may include, for example, the type of service requested, the cost of the service, the status of the subscriber, etc. The transaction data is sent to the volatile memory database for storage (406). Note that this volatile memory database implements the entire transaction database for optimal access speed.

In step 408, data in the volatile memory database is persisted to a nonvolatile memory database to minimize the risk of data loss in the event of system failure. The synchronization may be performed periodically (with the period being predefined or operator-configurable) or may be performed upon the occurrence of certain predefined or operator-configurable triggering event (such as, for example, the presence of a given amount of new transaction data).

Given the various embodiments disclosed above, it should be recognized that variations are possible. For example, it is possible to combine the use of a suspect subscriber list with a service interruption approach if the concurrent response-determinative processing of the SAR reveals that allowing the subscriber to complete the requested service would cause the subscriber's account balance to fall below a certain threshold or to fall below zero. In an example case, the subscriber may be allowed to proceed with the service until the account reaches zero, or the subscriber may be warned that unless provisions are made to replenish the account before the balance reaches zero, service interruption may occur even after the service is permitted to begin.

By using a suspect subscriber list to quickly determine whether to immediately authorize a SAR, the authorization application of embodiments of the present invention advantageously reduces the time delay associated with SAR processing for credit-worthy subscribers. If a subscriber, by mistake or by design, proves to be suspect by permitting his account balance to fall below a certain threshold or to fall below zero, that subscriber is put on the suspect subscriber list and is required to have his subsequent SAR fully processed before access is permitted the next time. Note that a fraudulent subscriber can, at most, obtain service only once before he is put on the suspect list. In this manner, a fraudulent subscriber does not have the opportunity to obtain services over and over without maintaining sufficient funds in his account to pay for the services, as is possible with the prior art hot billing approach.

The use of the smaller suspect subscriber list to quickly decide whether to approve or deny a SAR is advantageous since using the larger "good subscriber list" would have required greater resources to maintain and would have involved a greater overhead and delay associated with searching through a larger file. Speed is further improved by using a volatile memory database to store the transaction data. By frequently persisting the volatile memory database to nonvolatile memory, the risk associated with data loss due to system error is substantially reduced, rendering the use of a volatile memory database acceptable for storing transaction data.

While this invention has been described in terms of several embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for handling a service authorization request (SAR) from a mobile subscriber, said SAR representing a request for access to a prepaid mobile service, comprising:
    ascertaining, by a computer using a suspect subscriber list, whether said SAR is associated with a suspect subscriber in said suspect subscriber list prior to obtaining an authorization response from response-determinative processing performed on said SAR, wherein said authorization response provides one of approval and disapproval to access said prepaid mobile service associated with said SAR;
    in response to ascertaining that said SAR is not associated with any suspect subscriber in said suspect subscriber list, authorizing, by the computer, said SAR to access said prepaid mobile service without first obtaining said authorization response; and
    after said authorizing, obtaining said authorization response by performing said response-determinative processing on said SAR concurrently with the mobile subscriber who issued said SAR accessing said prepaid mobile service.

2. The method of claim 1 wherein said SAR is authorized, in response to ascertaining that said SAR is not associated with any suspect subscriber in said suspect subscriber list, before performing a subscriber status lookup for said SAR.

3. The method of claim 1 wherein said SAR is authorized, in response to ascertaining that said SAR is not associated with any suspect subscriber in said suspect subscriber list, before rating a service associated with said SAR.

4. The method of claim 1 wherein said SAR is authorized, in response to ascertaining that said SAR is not associated with any suspect subscriber in said suspect subscriber list, before determining subscriber balance sufficiency for servicing said SAR.

5. The method of claim 1 wherein said SAR is authorized, in response to ascertaining that said SAR is not associated with any suspect subscriber in said suspect subscriber list, before storing transaction data associated with said SAR.

6. The method of claim 1 further comprising storing, in response to ascertaining that said SAR is not associated with any suspect subscriber in said suspect subscriber list, transaction data associated with said SAR after said authorizing in a volatile memory database.

7. The method of claim 6 further comprising periodically persisting said volatile memory database to a nonvolatile memory database.

8. The method of claim 1, wherein
    if said response-determinative response processing determines that a pre-paid account balance associated with said mobile subscriber who issued said SAR falls below a predefined threshold as a result of servicing said SAR, putting said mobile subscriber who issued said SAR on said suspect subscriber list.

9. The method of claim 1 further comprising:
    in response to ascertaining that said SAR is associated with any suspect subscriber in said suspect subscriber list, performing said response-determinative processing of said SAR to obtain said authorization response for said SAR; and
    authorizing said SAR only if said authorization response represents an approval for said SAR.

10. The method of claim 9 wherein said response-determinative processing includes performing a subscriber status lookup for said SAR.

11. The method of claim 10 wherein said response-determinative processing further includes rating a service associated with said SAR.

12. The method of claim 11 wherein said response-determinative processing further includes determining subscriber balance sufficiency for said mobile subscriber that issued said SAR.

13. The method of claim 9 wherein said response-determinative processing includes storing transaction data associated with said SAR.

14. The method of claim 1 further comprising determining, prior to said ascertaining, whether a service associated with said SAR represents a service that always requires said response-determinative processing of said SAR to obtain said authorization response prior to being authorized.

15. The method of claim 1 wherein said SAR is issued from a mobile device.

16. The method of claim 15 wherein said SAR is issued from a cellular telephone.

17. The method of claim 15 wherein said SAR is issued from a wireless computing device.

18. An article of manufacture comprising a non-transitory program storage medium having computer readable code embodied therein, said computer readable code being configured to handle a service authorization request (SAR) from a mobile subscriber, said SAR representing a request for access to a prepaid mobile service, wherein upon execution, said computer readable code causes a system having a processor to:
 ascertain whether said mobile subscriber that issued said SAR is in a suspect subscriber list prior to obtaining an authorization response from response-determinative processing performed on said SAR, wherein said authorization response provides one of approval and disapproval to access said prepaid mobile service associated with said SAR;
 authorize said SAR to access said prepaid mobile service, in response to ascertaining that said mobile subscriber is not in said suspect subscriber list, without waiting until said authorization response is obtained; and
 after said authorizing, obtain said authorization response by completing said response-determinative processing concurrently with servicing said authorized SAR.

19. The article of manufacture of claim 18 wherein said SAR is authorized, in response to ascertaining that said mobile subscriber is not in said suspect subscriber list, before rating a service associated with said SAR.

20. The article of manufacture of claim 18 wherein said SAR is authorized, in response to ascertaining that said mobile subscriber is not in said suspect subscriber list, before determining subscriber balance sufficiency for servicing said SAR.

21. The article of manufacture of claim 18, wherein said computer readable code further causes the system having the processor to store, in response to ascertaining that said mobile subscriber is not in said suspect subscriber list, transaction data associated with said SAR after said authorizing in a volatile memory database.

22. The article of manufacture of claim 21, wherein said computer readable code further causes the system having the processor to periodically persist said volatile memory database to a nonvolatile memory database.

23. The article of manufacture of claim 18, wherein said computer readable code further causes the system having the processor to put said mobile subscriber who issued said SAR on said suspect subscriber list if said response-determinative processing determines that a pre-paid account balance associated with said SAR falls below a predefined threshold as a result of said servicing of said SAR.

24. The article of manufacture of claim 18, wherein said computer readable code further causes the system to:
 perform said response-determinative processing of said SAR, in response to ascertaining that said mobile subscriber is in said suspect subscriber list, to obtain said authorization response; and
 authorize said SAR only if said authorization response represents an approval for said SAR.

25. The article of manufacture of claim 24 wherein said response-determinative processing includes rating a service associated with said SAR.

26. The article of manufacture of claim 25 wherein said response-determinative processing includes determining subscriber balance sufficiency for said SAR.

27. An arrangement for handling a service authorization request (SAR) from a mobile subscriber, said SAR representing a request for access to a prepaid mobile service, comprising:
 a storage media to store a suspect subscriber list, said suspect subscriber list identifying suspect subscribers whose SARs require authorization before being allowed to access prepaid mobile services; and
 at least one processor to:
  ascertain whether said mobile subscriber that issued said SAR is in said suspect subscriber list prior to obtaining an authorization response from response-determinative processing performed on said SAR, wherein said authorization response provides one of approval and disapproval to access said prepaid mobile service associated with said SAR;
  authorize said SAR to authorize said prepaid mobile service, in response to ascertaining that said mobile subscriber is not in said suspect subscriber list, without first obtaining said authorization response; and
  after said authorizing, obtain said authorization response by performing said response-determinative processing on said authorized SAR concurrently with the mobile subscriber who issued said SAR accessing said prepaid mobile service.

28. The arrangement of claim 27 wherein said SAR is authorized, in response to ascertaining that said mobile subscriber is not in said suspect subscriber list, before determining subscriber balance sufficiency for servicing said SAR.

29. The arrangement of claim 27, wherein said at least one processor is to further:
 if said response-determinative response processing provides said authorization response indicating that a prepaid account balance associated with said mobile subscriber who issued said SAR falls below a predefined threshold as a result of servicing said authorized SAR, place said mobile subscriber who issued said SAR on said suspect subscriber list.

30. The arrangement of claim 27, wherein:
 in response to ascertaining that said mobile subscriber is an said suspect subscriber list, said at least one processor to complete said response-determinative processing of said SAR to obtain said authorization response; and
 authorize said SAR only if said authorization response represents an approval for said SAR.

31. The arrangement of claim 27, wherein said at least one processor is to further determine, prior to said ascertaining, whether a service associated with said SAR represents a service that always requires said response-determinative processing of said SAR prior to being authorized.

32. The arrangement of claim 27 wherein said SAR is issued from a cellular telephone.

33. The arrangement of claim 27 wherein said SAR is issued from a wireless computing device.

* * * * *